United States Patent
Hammill

(10) Patent No.: US 12,548,036 B2
(45) Date of Patent: Feb. 10, 2026

(54) AUTHENTICATION AND IDENTIFICATION OF PRODUCTS

(71) Applicant: Microchip Technology Incorporated, Chandler, AZ (US)

(72) Inventor: Brian Hammill, Richfield, NC (US)

(73) Assignee: Microchip Technology Incorporated, Chandler, AZ (US)

( * ) Notice: Subject to any disclaimer, the term of this patent is extended or adjusted under 35 U.S.C. 154(b) by 187 days.

(21) Appl. No.: 18/377,357

(22) Filed: Oct. 6, 2023

(65) Prior Publication Data

US 2024/0119466 A1 Apr. 11, 2024

Related U.S. Application Data

(60) Provisional application No. 63/414,099, filed on Oct. 7, 2022.

(51) Int. Cl.
| | |
|---|---|
| *G06Q 30/018* | (2023.01) |
| *H04L 9/32* | (2006.01) |
| *G06F 8/65* | (2018.01) |
| *G06F 21/44* | (2013.01) |
| *G06F 21/73* | (2013.01) |
| *H04L 9/00* | (2022.01) |

(52) U.S. Cl.
CPC ....... *G06Q 30/0185* (2013.01); *H04L 9/3242* (2013.01); *G06F 8/65* (2013.01); *G06F 8/66* (2013.01); *G06F 21/44* (2013.01); *G06F 21/73* (2013.01); *G06Q 2220/00* (2013.01); *H04L 9/00* (2013.01)

(58) Field of Classification Search
None
See application file for complete search history.

(56) References Cited

U.S. PATENT DOCUMENTS

| | | | |
|---|---|---|---|
| 8,261,327 B2 | 9/2012 | Keeler et al. | 726/4 |
| 9,838,250 B1 * | 12/2017 | Ali | H04L 67/125 |

(Continued)

FOREIGN PATENT DOCUMENTS

| | | | | |
|---|---|---|---|---|
| CN | 109257328 B | * | 3/2021 | H04L 9/3247 |
| CN | 115017075 A | * | 9/2022 | G06F 13/4068 |

(Continued)

OTHER PUBLICATIONS

International Search Report and Written Opinion, Application No. PCT/US2023/034653, 11 pages, Feb. 5, 2024.

(Continued)

*Primary Examiner* — Ali H. Cheema
(74) *Attorney, Agent, or Firm* — SLAYDEN GRUBERT BEARD PLLC

(57) ABSTRACT

An apparatus comprising: a pin to connect to a resistor and a power source; a measurement circuit to measure a voltage at the pin; a circuit to determine a mapped identification value of the apparatus based upon the voltage at the pin, the mapped identification value coding the apparatus as an instance of a product from a set of products; and an authentication circuit. The authentication circuit: calculates an authentication code using the mapped identification value; and provides the authentication code to an authentication host upon request from the authentication host.

12 Claims, 4 Drawing Sheets

(56) References Cited

U.S. PATENT DOCUMENTS

| | | | | |
|---|---|---|---|---|
| 2003/0151539 | A1* | 8/2003 | Wuidart | G11C 14/00 341/200 |
| 2009/0069920 | A1* | 3/2009 | Franzen | G06Q 10/06 700/97 |
| 2012/0036364 | A1* | 2/2012 | Yoneda | H04L 9/006 713/175 |
| 2014/0093074 | A1* | 4/2014 | Gotze | G06F 21/73 380/45 |
| 2017/0257762 | A1* | 9/2017 | Ginzboorg | H04W 12/069 |
| 2019/0066466 | A1* | 2/2019 | Marszalek | G08B 13/1445 |
| 2019/0188730 | A1* | 6/2019 | Smets | G06Q 30/06 |
| 2020/0356943 | A1* | 11/2020 | Strom | G08B 13/1409 |
| 2021/0028683 | A1* | 1/2021 | Jiang | H02M 1/084 |
| 2022/0113925 | A1* | 4/2022 | Blaser | H02J 50/005 |
| 2024/0141267 | A1* | 5/2024 | Horiuchi | C12M 41/12 |

FOREIGN PATENT DOCUMENTS

| | | | | |
|---|---|---|---|---|
| JP | 2017126849 | A * | 7/2017 | |
| TW | I536499 | B * | 6/2016 | H01L 21/00 |
| TW | 202107811 | A * | 2/2021 | H02M 3/1584 |
| WO | WO-2012001615 | A1 * | 1/2012 | G06F 21/44 |
| WO | WO-2018140080 | A1 * | 8/2018 | H04W 12/069 |

OTHER PUBLICATIONS

Schneier, Bruce, "Applied Cryptography: Protocols, Algorithms, and Source Code in C," Second Edition, John Wiley & Sons, ISBN: 0471128457, 662 pages, Jan. 1, 1996.

* cited by examiner

AUTHENTICATION AND IDENTIFICATION OF PRODUCTS

RELATED CASES

This application claims priority to the commonly owned U.S. Patent Application No. 63/414,099 filed Oct. 7, 2022, the contents of which are hereby incorporated by reference for all purposes.

TECHNICAL FIELD

The present disclosure relates to electronic identification of devices. Various examples include methods and/or apparatus for cryptographic authentication and identification with assembly time configuration of identifying characteristics.

BACKGROUND

Manufacturing, assembling, and packaging lines may assemble products, including consumable products, in insecure locations. Moreover, such lines may involve management of inventory of multiple products with individual part numbers or stock keeping units (SKU). Such lines may be used to identify and authenticate parts but such lines may be located in factories which are not trusted or may not have access to trusted servers for identification and authentication.

SUMMARY

Apparatus and/or methods incorporating teachings of the present disclosure may include authentication using an additional layer of key derivation based on an integer numeric identifier that is configurable by a creator of a device without pre-programming an integrated circuit (IC) of the device. For example, an example apparatus may include: a pin to sample a voltage at a point between a resistor and a current source; an analog-to-digital (A/D) converter to convert a signal from the pin into a digital signal; a bit masking circuit to filter the digital signal and determine a mapped identification value of the apparatus based upon the filtered digital signal, the mapped identification value corresponding to a particular instance of a product from a set of products; and an authentication circuit to: calculate an authentication code using the mapped identification value; and provide the authentication code to an authentication host upon request from the authentication host.

Another example apparatus may include: an integrated circuit (IC); a pin on the IC connected to a resistor and a power source; a measurement circuit in the IC to determine a voltage at the pin; a calculation circuit in the IC to determine a mapped identification value of the apparatus based upon the voltage at the pin, the mapped identification value coding the apparatus as a particular instance of a product from a set of products; and an authentication circuit in the IC to: calculate an authentication code using the mapped identification value; and provide the authentication code to an authentication host upon request from the authentication host.

An example method incorporating teachings of the present disclosure may include: receiving a voltage from a point between a resistor and a current source; determining a mapped identification value of an apparatus based upon the voltage, the mapped identification value coding the apparatus as a particular instance of a product from a set of products; calculating an authentication code using the mapped identification value; and providing the authentication code to an authentication host upon request from the authentication host.

Another example method may include: identifying a product type to be produced from a set of product types, the product type including an integrated circuit (IC) to identify and authenticate an instance of the product type; and based upon the type of product, connecting a selected resistor to a pin of the product, the selected resistor indicating the product type.

BRIEF DESCRIPTION OF THE DRAWINGS

The teachings of the present disclosure include apparatus and/or methods for authentication using an additional layer of key derivation based on an integer numeric identifier that is configurable by a creator of a device without pre-programming the device. Some examples of apparatus and methods are represented in the drawings, in which.

DETAILED DESCRIPTION

Examples of the present disclosure may include authentication using an additional layer of key derivation based on an integer numeric identifier that is configurable by a creator of a device without pre-programming an IC of the device. Examples of the present disclosure may include devices with a single chip implementation but usable as one of multiple different products or stock keeping units (SKU). Apparatus and/or methods incorporating teachings of the present disclosure may reduce mistakes due to incorrect programming or mounting an incorrect chip on a board and may simplify creating multiple configurations for various devices.

The apparatus and/or methods may include using a discrete number as part of a key or other information for authentication with the purpose of identifying different SKUs as part of the authentication process. The discrete number may be one number of a set of possible numbers and may be, for example, an integer value. The discrete number may be configurable at assembly time through, for example, a choice of components with different values such as resistors.

Figure 1:
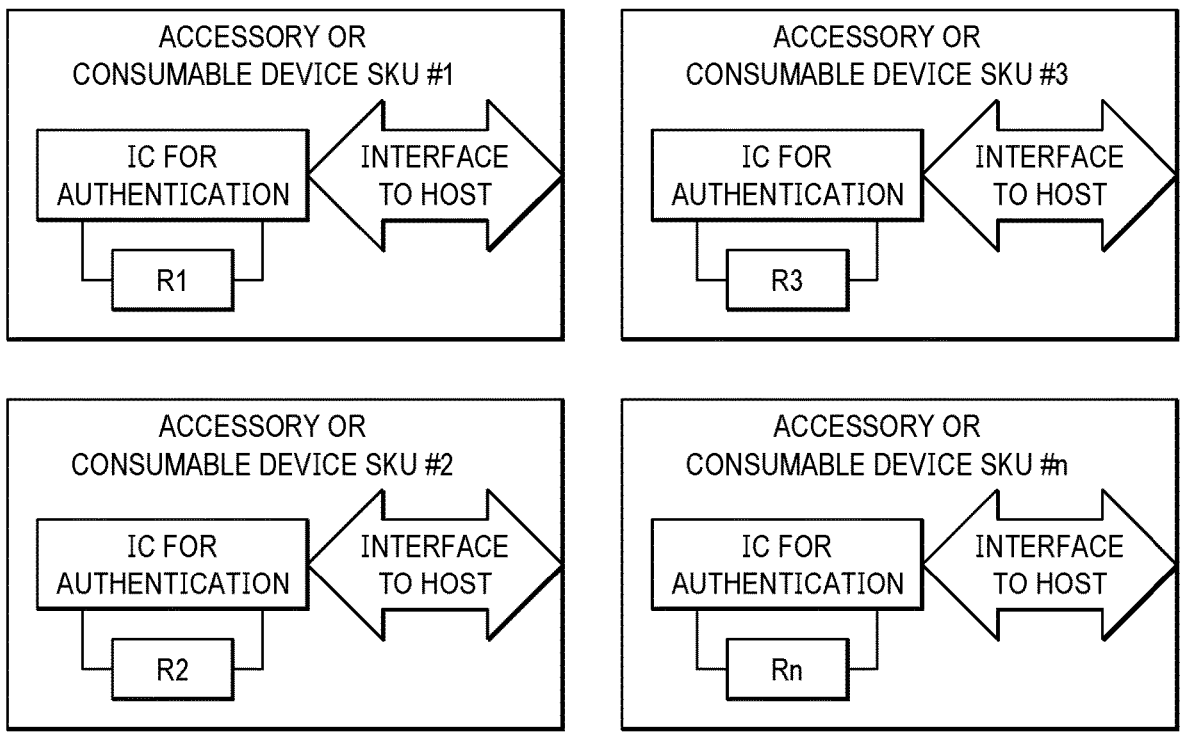
FIG. 1 is a schematic drawing showing multiple example apparatus incorporating teachings of the present disclosure.

FIG. 1 is a diagram showing a schematic view of different example apparatus incorporating teachings of the present disclosure. FIG. 1 shows four different devices having an IC for authentication. The IC may include any suitable implementation without limitation, e.g., stored instructions for execution by a processor, an application specific integrated circuit, a die, a field programmable gate array, a programmable logic device, analog circuitry, digital circuitry, or any suitable combination thereof. The IC may have an interface to a host. The interface may be provided through any suitable communications format. The host may include any suitable implementation without limitation, e.g., a computer, server, test machine, or any other suitable electronic device.

An authentication device or IC may include any suitable implementation without limitations, e.g., instructions for execution by a processor, an application specific integrated circuit, die, a field programmable gate array, a programmable logic device, analog circuitry, digital circuitry, or any suitable combination thereof.

The devices may include any suitable article, such as a computer, consumer device, consumable, printer cartridge, toner cartridge, or color cartridge. The devices may be categorized as different products, denoted by different SKU numbers. The devices may be distinguished by an external resistor, denoted in FIG. 1 as R1, R2, R3, Rn. The resistance value of the external resistor may categorize the device as a given product. The resistance value of the resistor may vary according to each SKU so that a standardized IC with a symmetric parent key can be used to identify and authenticate itself.

In such examples, symmetric keys are known to both parties involved in an authentication process. Some methods use a single parent key in both the authenticator and the authenticated device. Alternative, more secure methods utilize a parent key in the authenticator and a derived key in the authenticated device. The derived key is the result of a cryptographic hash of the parent key with the authenticated device's serial number. In these cases, a malicious actor who accesses the derived key does not thereby gain access to the parent key. In some of the methods described herein, a derived key can be pre-placed in the authenticated device and further derived by a cryptographic hash with the mapped identification value. The authenticator can read the serial number and the identifying value (the value from the external resistor) and create the doubly derived key to authenticate both the device and the device SKU.

Apparatus and/or methods incorporating teachings of the present disclosure can be used to identify a distinct article among the different products, e.g., by SKU or configuration. The teachings of the present disclosure can be used and included in an IC design. Some examples, without limitation, include analog and mixed-signal building blocks to produce an integer ID value with sufficient resolution as to identify N different configurations. The ID Value may be included in a cryptographically generated message authentication code that can be generated by the device IC and validated by the Host.

As an example, a given apparatus comprising an IC may be used to implement eight different ink or flavor cartridges without requiring changes to the IC or a printed circuit board (PCB). That is, the same IC and PCB may be used for each color or flavor of a given product (e.g., each SKU). Logistics of manufacturing may limit the use of automated test and programming. Moreover, the producer of the product may wish to purchase and use, in aggregate, a single type of IC rather than eight different factor provisioned parts. The teachings of the present disclosure can use a single component option to determine the ID value at manufacturing.

This can allow for one part number per project including one custom provisioning and a secret exchange with the host for multiple products. This can facilitate consolidation of a total number of parts produced and stocked, better serving the consumable market. FIG. 1 shows a set of four products. Each particular product comprises a particular instance of a product from the set of products. Each particular product instance, however, shares the same IC as shown. The apparatus and methods described herein may be used with a much larger set of products. As described below with respect to Table 1, a set of 8 discrete products may use the same IC without separate programming or requiring separate provisioning for each product in the set.

An example apparatus may require only a single pin which lowers cost and reduces attack surface. The term pin, as used herein, includes any connection from an IC, including, without limitation, solder balls or lands. Further, the apparatus may provide a secure solution that uses an identifier as part of the cryptographic authentication. This may facilitate low-tech manufacturing lines without programming equipment as devices may be programmed with one of a plurality or set of SKU by using an external resistor, streamlining production line operations when multiple SKUs are involved. The teachings of the present disclosure can be used in any suitable product, including without limitation those in medical and e-cigarette, battery swapping for e-mobility, cosmetics, air scent and freshener, sodas, or any other suitable device. Moreover, the teachings of the present disclosure can be implemented to identify and authenticate physical characteristics of a pluggable, swappable, or consumable, such as color, flavor or scent, strength, or capacity (battery or other storage). In such cases, the mapped identification value may correspond to a physical characteristic of the product.

The apparatus and/or methods described herein can utilize a single pin from the IC to interface both with the identifying resistor and with test equipment for validation. The teachings can be used to authenticate a cartridge, consumable, or other device as well as an identifying value of the SKU of such a device. This might allow reallocation of inventory of the same kind of ICs to production of different inventory. Further, some examples can secure devices against future modification with an option to determine and lock the mapped identification value of the product in a one-time programmable memory. This may be performed by the device IC or a host IC, device, or equipment.

The apparatus and/or methods may facilitate ID determination at assembly time without programming and may include ID in a message authentication code (MAC) ensuring integrity and authenticity. This is in contrast to options which require unique programming and individual handling of authentication for integrated circuits. Other solutions may require using multiple pins or writing an ID code to memory on a device. In some examples, a calculation circuit in the IC uses the mapped identification value to code the apparatus as a particular instance of a product from a set of products.

Figure 2:
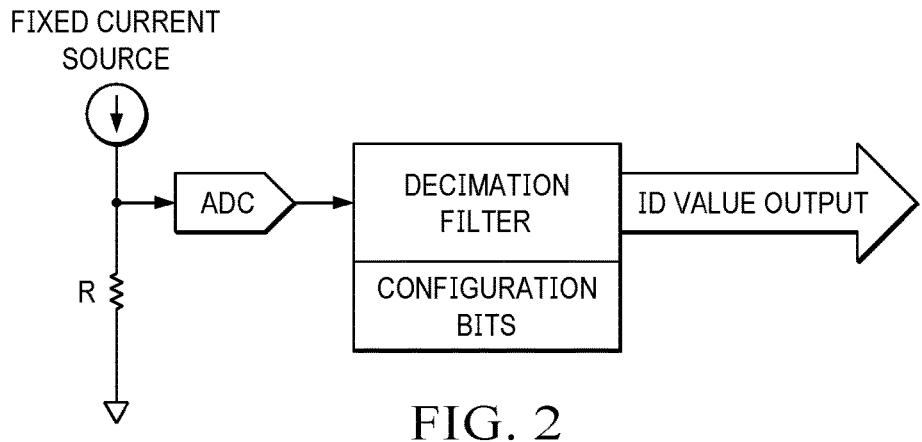
FIG. 2 is a drawing showing a schematic drawing of an example circuit for the apparatus shown in FIG. 1.

FIG. 2 is a drawing showing a schematic drawing of an example circuit for the apparatus shown in FIG. 1. A power source may be applied to a pin of the IC in communication with a resistor R. As shown in FIG. 2, the power source may comprise a current source. Alternative power sources may be used if they are relatively constant such as a regulated voltage source. The power source is applied to a first lead of the resistor R. A second lead of the resistor R is coupled to a common potential or a return for the power source. The pin of the IC is coupled to the first lead of the resistor R.

As shown in FIG. 2, a signal from the pin is fed to an analog-to-digital (A/D) converter of the IC to convert the voltage at the pin to a digital value. The digital value may be translated or filtered into a mapped ID value, including bit masking or other schemes. Filtering the digital value reduces the number of finite discrete values mapped to a range of input and may eliminate the effect of minor variations of the input voltage.

In the example shown, the filter includes a decimation filter of the IC which may include, without limitation, instructions for execution by a processor, an application specific integrated circuit, die, a field programmable gate array, a programmable logic device, analog circuitry, digital circuitry, or any suitable combination thereof. The mapped ID value may be used by other parts of the IC. An example translation between voltages and resistor values may is given in Table 1. In this example, taking an 8-bit A/D converter output from a variety of resistor values produces a range of voltages between 0 and 2.5 volts. Filtering the result by masking away the lowest 5 bits gives 8 discrete output values:

TABLE 1

| Resistor Value (Ohms) | Voltage | A/D Reading | ID Output Value |
|---|---|---|---|
| 100.00 | 0.20 | 20 | 0 |
| 120.00 | 0.24 | 24 | 0 |
| 170.00 | 0.34 | 34 | 32 |
| 220.00 | 0.44 | 45 | 32 |
| 270.00 | 0.54 | 55 | 32 |
| 290.00 | 0.58 | 59 | 32 |
| 322.00 | 0.64 | 65 | 64 |
| 330.00 | 0.66 | 67 | 64 |
| 430.00 | 0.86 | 88 | 64 |
| 455.00 | 0.91 | 93 | 64 |
| 470.00 | 0.94 | 96 | 96 |
| 535.00 | 1.07 | 109 | 96 |
| 560.00 | 1.12 | 114 | 96 |
| 610.00 | 1.22 | 124 | 96 |
| 680.00 | 1.36 | 139 | 128 |
| 730.00 | 1.46 | 149 | 128 |
| 760.00 | 1.52 | 155 | 128 |
| 790.00 | 1.58 | 161 | 160 |
| 820.00 | 1.64 | 167 | 160 |
| 900.00 | 1.80 | 184 | 160 |
| 950.00 | 1.90 | 194 | 192 |
| 1000.00 | 2.00 | 204 | 192 |
| 1100.00 | 2.20 | 225 | 224 |
| 1200.00 | 2.40 | 245 | 224 |

In practice, an authentication host may request an authentication of a given product. In response, a voltage from a point between the resistor and the current source is determined. Based upon that voltage, the mapped identification value may be determined. As in the description above, the mapped identification value codes the apparatus as a particular instance of a product from a set of products. The mapped identification code may be used to calculate a message authentication code. Finally, that message authentication code is returned to the requesting authentication host.

Figure 3:
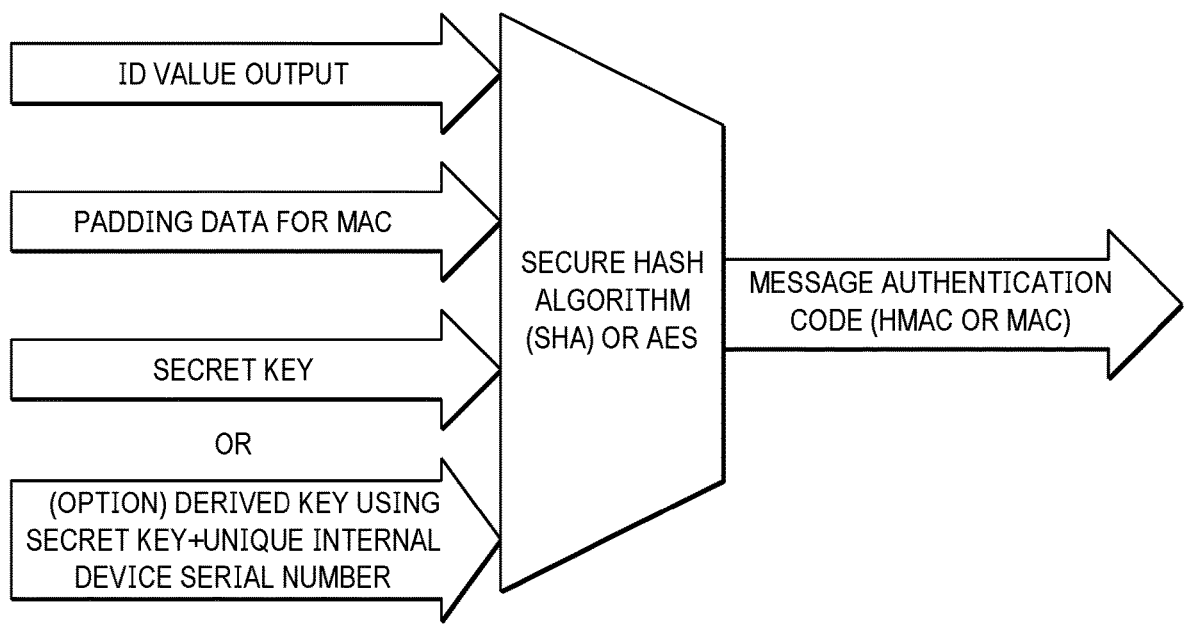
FIG. 3 is a drawing showing an example flow of data for a method incorporating teachings of the present disclosure.

FIG. 3 is a drawing showing an example flow of data for a method incorporating teachings of the present disclosure. The top arrow shows the mapped ID value, which may be the output of the circuit shown in FIG. 2. The mapped ID value may be combined with other information, labeled Padding Data for MAC in FIG. 3, as well as a secret key known to or derivable by a host and the device. The mapped ID value, other information, and the secret key may be hashed by a secure hash algorithm (SHA), or advanced encryption standard (AES) algorithm, or another encryption algorithm to generate a MAC. The MAC may be provided by the device to the host, which may then used by the host to authenticate the MAC. In some options, a derived key may be formed using the secret key and a unique internal device serial number. This option allows use of a diversified key which may improve protection for the secret key and authenticates the ID of the device by serial number in addition to authenticating the SKU through the ID value output. An example authentication process is shown in FIG. 4.

Figure 4:
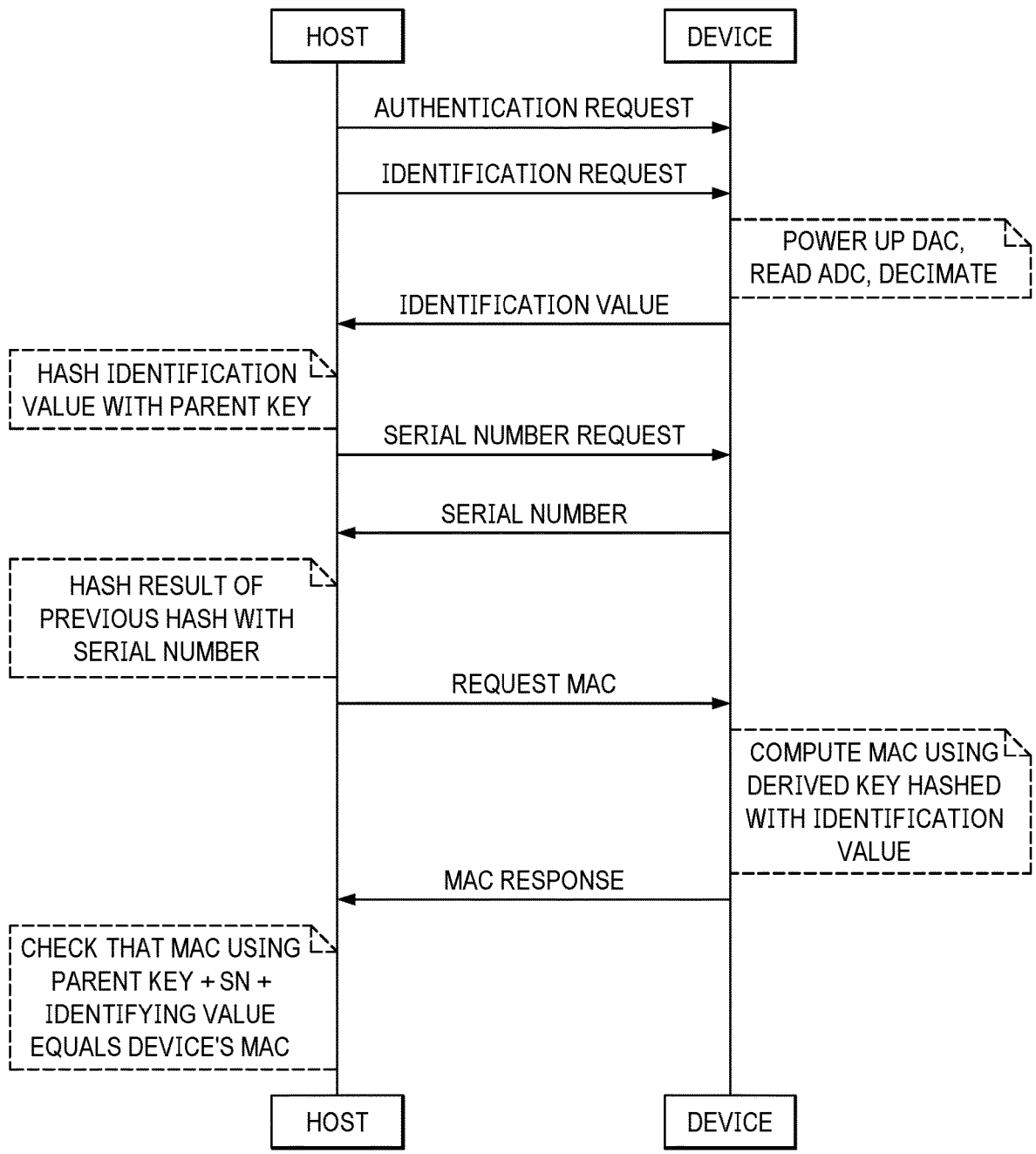
FIG. 4 is a drawing showing a transaction diagram incorporating teachings of the present disclosure.

FIG. 4 is a swim diagram showing an example authentication method incorporating teachings of the present disclosure. The diagram illustrates step and data used to complete cryptographic authentication and identification by SKU and serial number. The process allows an authentication Host to authenticate a Device including one or more of the apparatus described herein. As shown, the Host makes an authentication request and an identification request to the Device. In response, the Device reads the signal, and produces the mapped identification value. The mapped identification value is sent from the Device to the Host. As shown, the Host hashes the mapped identification value with a secret key. The Host then sends a serial number request to the Device and the Device responds with the serial number of the Device. After receiving the serial number, the Host hashes the received serial number with the previous hash value.

The Host then requests a MAC from the Device. The Device computes a MAC using a derived key hashed with the mapped identification value produced above and the serial number of the Device, then provides the computed MAC as a response back to the Host. Finally, the Host checks the MAC using a parent key, the received serial number, and the mapped identification value against the Device's MAC. If they match, then the Device is assumed to be authenticated, and the manufacturing process may continue. If they do not match, an error message or a flag may be generated, indicating the Device is not authenticated. This allows the IC to calculate a message authentication code and provide that code to the requesting authentication Host.

Figure 5:
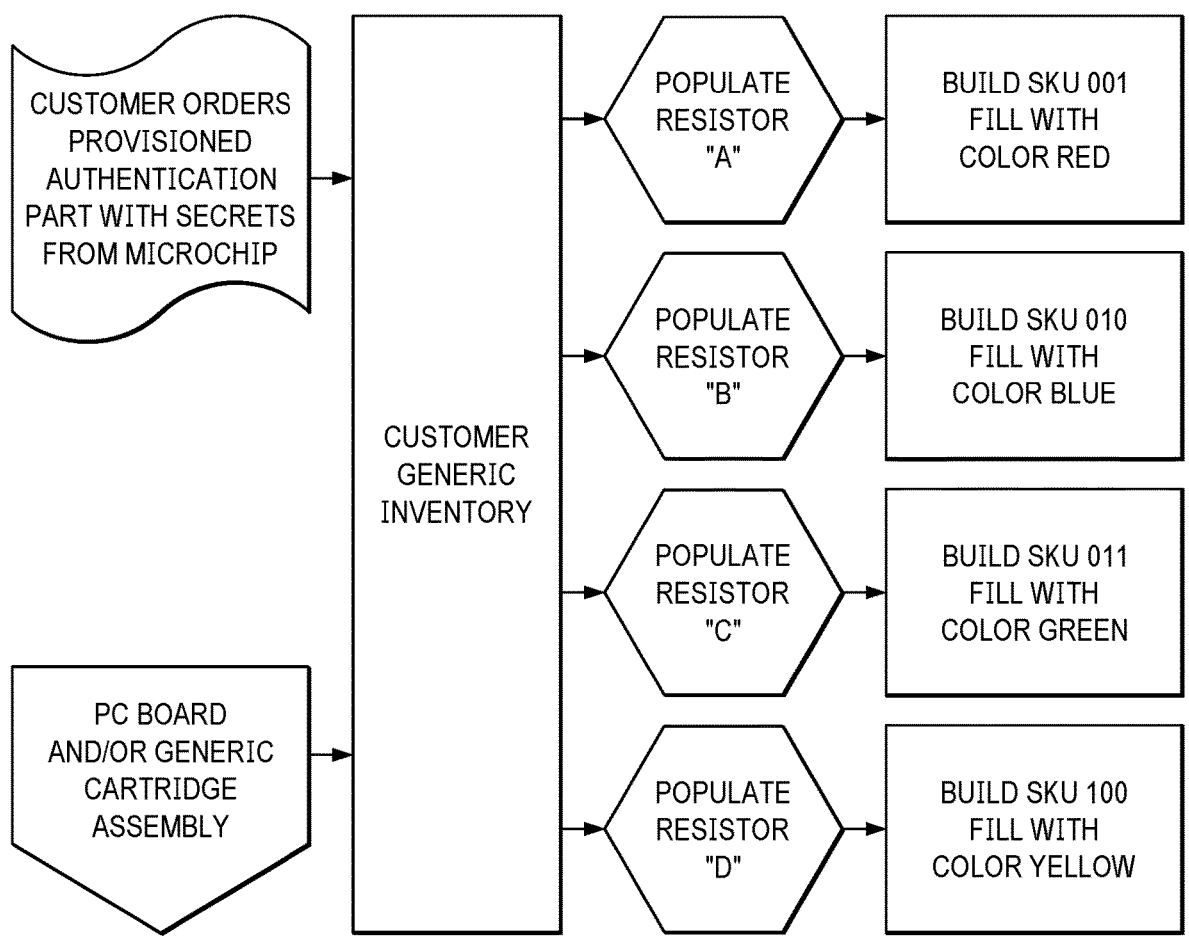
FIG. 5 is a flowchart showing an example method incorporating teachings of the present disclosure in a manufacturing process.

FIG. 5 is a flowchart showing an example method incorporating teachings of the present disclosure in a manufacturing process. The example method illustrates an example use case scenario for use of examples of the present disclosure. The method shown may be used to sort a customer's inventory into multiple SKU. The application of the provisioned authentication devices, when combined with a PCB or generic cartridge assembly, sorts a generic inventory into the various SKU shown by adding the proper resistor to each device without requiring unique programming and individual handling of ICs. Other solutions may require using multiple pins or writing to memory on a device digitally.

In practice, a customer may tag its inventory by adding corresponding resistors to the product. A method for tagging inventory may include identifying a product as a particular product type from a set (or list) of product types. That particular product type may include an IC used to identify and authenticate an instance of the product type. Based on the particular product type, a corresponding resistor is identified. Then, the resistor is connected to an appropriate pin on the IC, allowing one or more of the identification methods described herein. In some cases, each product type in the set of product types comprises a matching IC as described herein, allowing a single version of the IC to identify all of the product types in the set of product types. In some cases, the selection of a resistor corresponds to a physical characteristic of the product.

Although example apparatus and methods have been described above, other variations may result from the teachings of this disclosure without departing from the spirit and scope thereof.

I claim:
1. An apparatus comprising:
   an integrated circuit (IC) comprising:
      a pin configured to be connected to a resistor and a power source;

a calculation circuit to determine a mapped identification value of the apparatus based upon a range of voltage input at the pin, the mapped identification value coding the apparatus as a particular instance of a product from a set of products; and an authentication circuit to:

calculate a message authentication code, usable by an authentication host authenticate the apparatus as the particular instance of the product from the set of products, by hashing a combination that includes the mapped identification value and a secret key; and provide the message authentication code to the authentication host upon request from the authentication host.

2. The apparatus of claim 1, wherein the mapped identification value corresponds to a stock keeping unit (SKU) of the apparatus.

3. The apparatus of claim 1, wherein each product type within a set of product types includes a matching IC.

4. The apparatus of claim 1, wherein the calculation circuit determines the mapped identification value of the apparatus from data on the pin.

5. The apparatus of claim 1, wherein the IC permanently writes the mapped identification value upon a first determination of the mapped identification value.

6. The apparatus of claim 1, wherein the combination further includes a unique internal device serial number.

7. A method comprising:

receiving a voltage from a point between a resistor and a current source;

determining a mapped identification value of an apparatus based upon the voltage being within a range of voltages, the mapped identification value coding the apparatus as a particular instance of a product from a set of products;

calculating a message authentication code, usable by an authentication host authenticate the apparatus as the particular instance of the product from the set of products, by hashing a combination that includes the mapped identification value and a secret key; and providing the message authentication code to the authentication host upon request from the authentication host.

8. The method of claim 7, wherein the mapped identification value identifies a physical characteristic of the apparatus.

9. The method of claim 7, wherein providing the mapped identification value to the authentication host supports verification of the message authentication code.

10. The method of claim 7, further comprising:

determining the mapped identification value of the apparatus from data on a pin of the apparatus.

11. The method of claim 7, further comprising:

permanently writing a value of the mapped identification value upon a first determination of the mapped identification value.

12. The method of claim 7, wherein the combination further includes a unique internal device serial number.

\* \* \* \* \*